S. AMBLER.
DOFFING MECHANISM FOR SPINNING FRAMES.
APPLICATION FILED OCT. 12, 1917.

1,339,803.

Patented May 11, 1920.
6 SHEETS—SHEET 1.

INVENTOR:
Sam Ambler
ATTY.

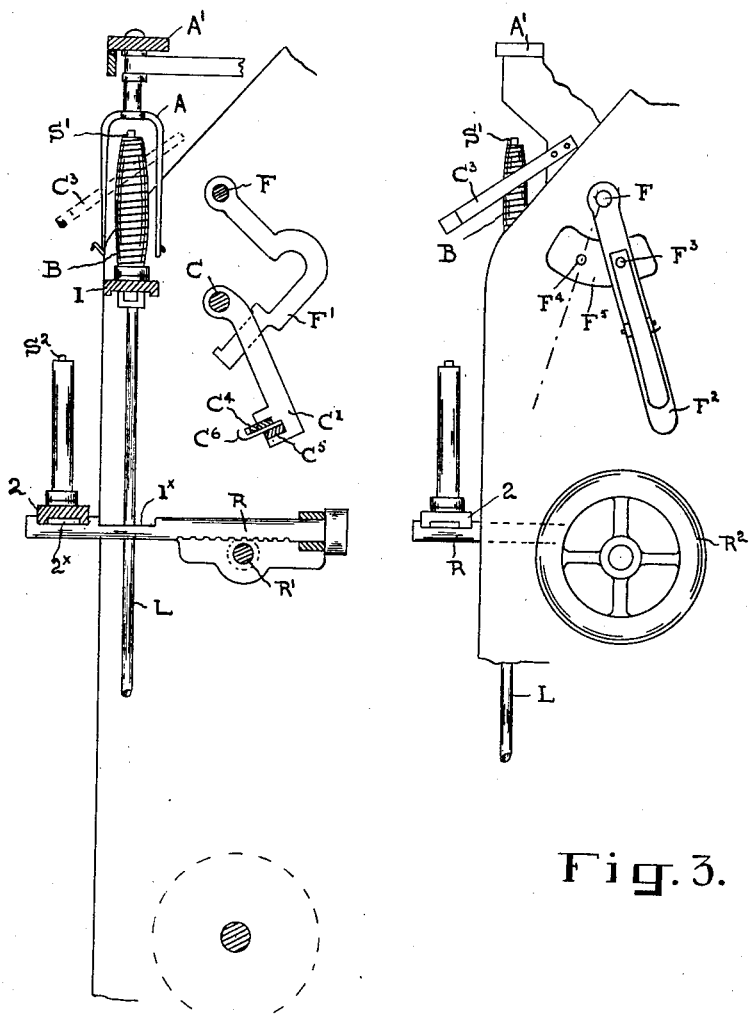

S. AMBLER.
DOFFING MECHANISM FOR SPINNING FRAMES.
APPLICATION FILED OCT. 12, 1917.

1,339,803.  Patented May 11, 1920.
6 SHEETS—SHEET 3.

INVENTOR:
By Sam Ambler
ATTY.

S. AMBLER.
DOFFING MECHANISM FOR SPINNING FRAMES.
APPLICATION FILED OCT. 12, 1917.

1,339,803.

Patented May 11, 1920.

INVENTOR:
Sam Ambler

S. AMBLER.
DOFFING MECHANISM FOR SPINNING FRAMES.
APPLICATION FILED OCT. 12, 1917.

1,339,803.

Patented May 11, 1920.
6 SHEETS—SHEET 5.

INVENTOR:
Sam Ambler
ATTY.

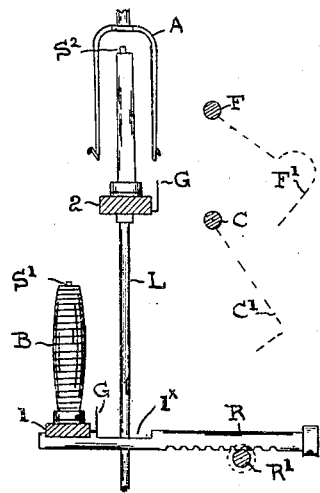
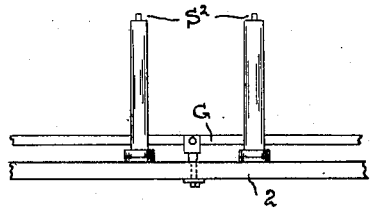
Fig.16.      Fig.17.
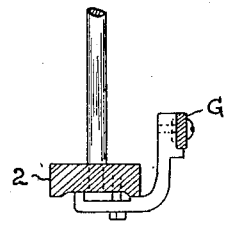
Fig.18.

UNITED STATES PATENT OFFICE.

SAM AMBLER, OF BRADFORD, ENGLAND.

DOFFING MECHANISM FOR SPINNING-FRAMES.

1,339,803.  Specification of Letters Patent.  Patented May 11, 1920.

Application filed October 12, 1917. Serial No. 196,185.

*To all whom it may concern:*

Be it known that I, SAM AMBLER, a subject of the King of Great Britain, residing at Midland Mills, Valley Road, Bradford, in the county of Yorkshire, England, have invented certain new and useful Improvements in Doffing Mechanism for Spinning-Frames, of which the following is a specification.

This invention relates to improvements in doffing mechanism for spinning frames and refers more particularly to that class of frame which has its fliers mounted on the top rail, capable of being driven, and spindles separate from the fliers carried on the spindle rail, and wherein such spindle rail has for the purpose of doffing requirements been in duplicate, my object being to arrange and construct improved doffing mechanism to the front of the frame such as has been used in later improvements in the type of apparatus previously referred to. The duplicate spindles and their rails being carried by racks or supports common to both, the necessary rising and falling motion being given by the spindle rail supports or lifting pillars connected to the lifter motion, and capable of operation by hand from time to time as required. I also provide means for holding the spindles and their rails in the up position from time to time as required, and for severing the yarn as hereinafter described.

In describing my invention in detail reference is made to the accompanying sheets of drawings wherein similar letters and numerals indicate similar parts, in which:—

Fig. 2 represents a sectional elevation.

Fig. 3 represents an end view.

Figs. 12–16 represent views of the parts in their respective position during an alternative form of doffing and Figs. 17 and 18 are details of a guide hereinafter referred to.

To carry my invention into effect, I employ two separate spindle rails 1 and 2 each having its own set of spindles or pegs $S'$ $S^2$. A series of supporting racks R are provided adapted to carry the said rails, each rack having two supporting notches or seats $1^x$ and $2^x$ and being capable of a movement in and out by means of suitable gearing $R'$ and hand wheel, lever, or the like, $R^2$ Figs. 1 and 3. The lifting pillars L engage and support one or other of the rails 1, 2, after the manner usual in this class of machinery, that is the lifting pillars L may be moved to support the rails or to be free of them. The lifting rods are operated by a handle $L'$ (Fig. 1) and gearing in the usual manner.

Adjacent to the fliers and for convenience behind same I mount a shaft F carrying a series of fingers or the like $F'$ adapted to be moved under and act as supports for one or other of the rails 1, 2, in their up position. On a shaft C somewhat below the shaft F I carry a cutter device $C'$ adapted to be moved or swung into position to the front of the upper rail to sever the yarn. I prefer to use a separate shaft for the fingers and cutter, but I may if desired carry both cutter bar and fingers from one shaft mounting the cutter loosely on the said shaft so that same will not swing forward when the fingers are put into operation.

Figure 1:
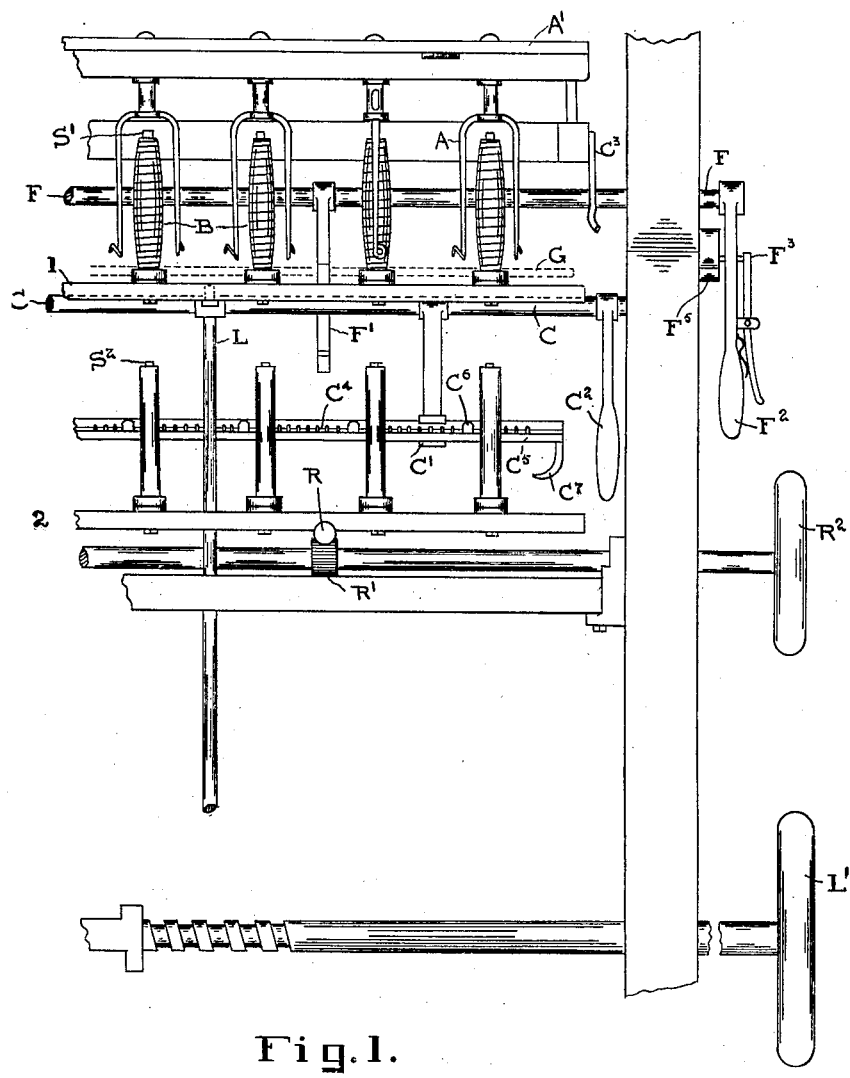
Figure 1 represents an elevation of a portion of a "fly" frame fitted with my improvement.

In the form shown in the drawings the finger shaft F is operated by a handle $F^2$ to one side of the frame, a trigger $F^3$ being provided in the said handle to engage indents or notches $F^4$ in a block or like $F^5$ and hold the fingers in or out of position as required (see Figs. 1 and 3).

The shaft C will be provided with a handle or the like $C^2$ Fig. 1. Where a handle $C^2$ is used as shown, a spring catch $C^3$ Figs. 1, 2, and 3 will be provided to hold same in the up or cutting position. The cutter device $C'$ is of any usual type, that shown (Figs. 1, 2, 10 and 11) being one comprising a notched bar $C^4$ and a sliding bar $C^5$ carrying upstanding cutters $C^6$ one for each spindle: the bar $C^5$ to cut being pulled quickly by its handle $C^7$.

The fliers A are held in the top rail $A'$ and are driven in any usual manner. There is no further mechanism with the exception of a thread guide used in a modified form of doffing hereinafter described.

The only projecting portions of mechanism are the racks R and the spindle rails when seated thereon and when the racks are moved out to their fullest extent.

In order that the working of the mechanism may be clearly understood I will describe same with reference to the diagrams showing the different positions. Figs. 1, 2, and 3 give the general assemblage of parts and Figs. 7 to 14 give the positions of the parts during the course of doffing.

Figure 4:
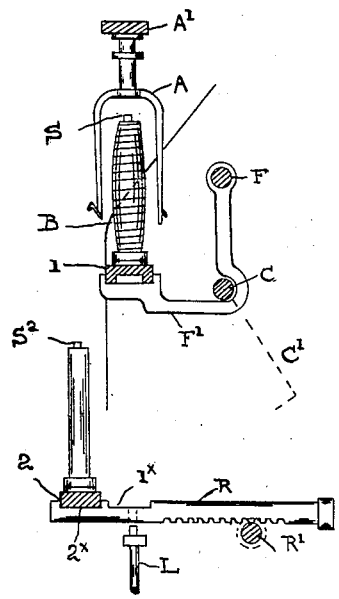
Figs. 4–11 represent views of the parts in their respective positions during doffing.
Figure 5:
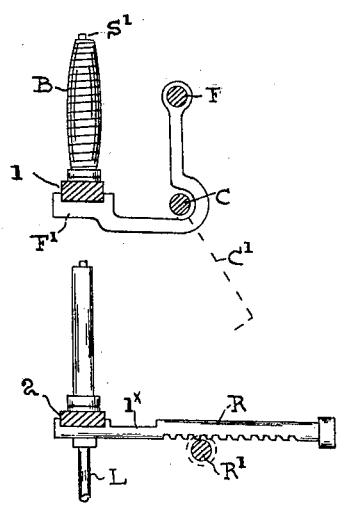
Figure 6:
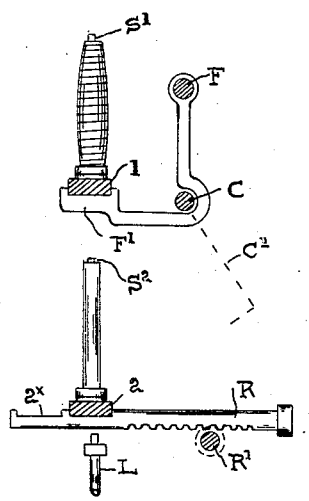
Figure 7:
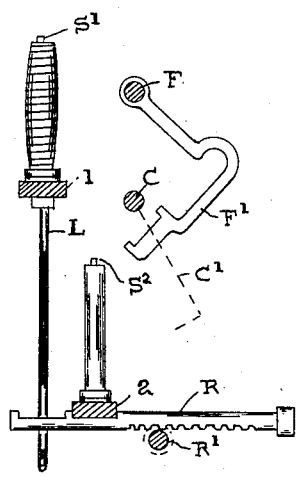
Figure 8:
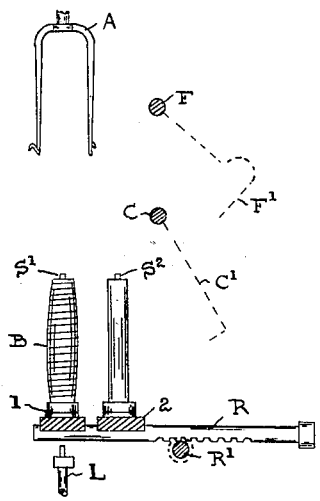
Figure 9:
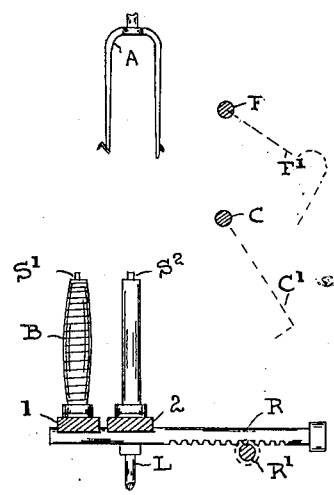
Figure 10:
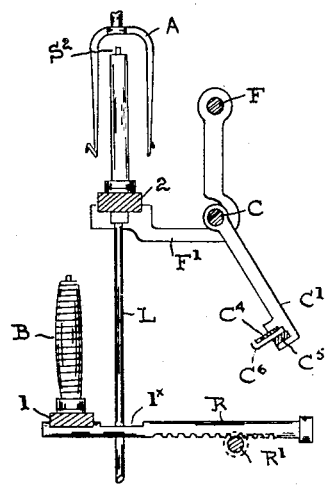
Figure 11:
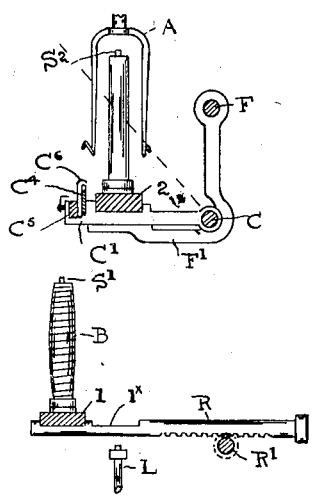

In Figs. 1 and 2 the rails 1 and 2 and their spindles and tubes or like are shown in the approximate positions they will occupy when the full bobbins or tubes are ready to be doffed. The next position is with the fingers F' turned forward to support the rail 1 (Fig. 4) when the lifting pillars L may be moved down to below the racks R. The rack R is now moved back or inward until the rail 2 is under the rail 1 (Fig. 5). The lifting pillars are now moved up to lift the rail 2 out of its supporting notch $2^x$ and the rack R is moved forward until the rail 2 may be dropped into position or notch $1^x$ as in Fig. 6. Next, the rack is moved back, until the notch $2^x$ is under the rail 1 and the empty bobbin or like is to the rear and the lifting rods are moved into engagement with the rail 1, and the fingers moved back as in Fig. 7. The rail 1 is now lowered into the notch $2^x$ to the front of the rack as will be seen by Fig. 8. The rack is moved out bringing the full bobbin to the front and the empty one under the fliers as shown in Fig. 9. Fig. 10 shows the next step where the empty bobbins and rail 2 have been raised adjacent to the fliers and the fingers F are brought in to hold said rail. The rods or pillars L are next withdrawn and the cutter swung into position as indicated in Fig. 11. The frame is now set on and the cutter is operated to sever the yarn. The cutter is next moved back, the lifter spindles or pillars are moved up into engagement with the rail 2, and the holder is withdrawn and the position is as shown in Fig. 2 with the exception that the full bobbin is to the front and the empty one is in spinning position. The full bobbins are removed during spinning and empty ones replaced on the spindles.

Figure 12:
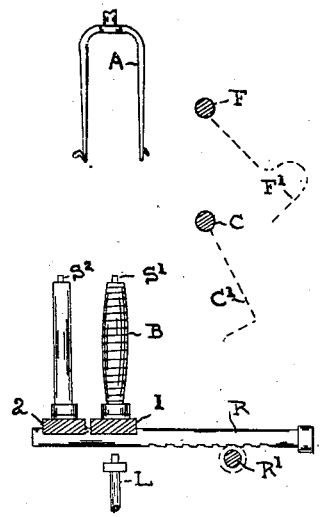
Figure 13:
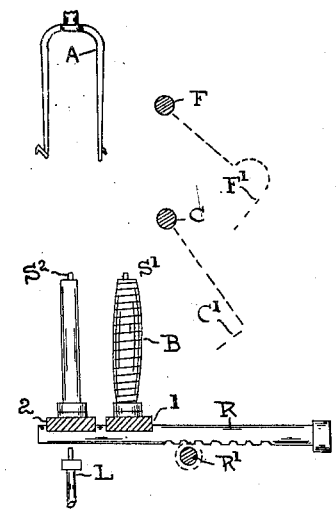
Figure 14:
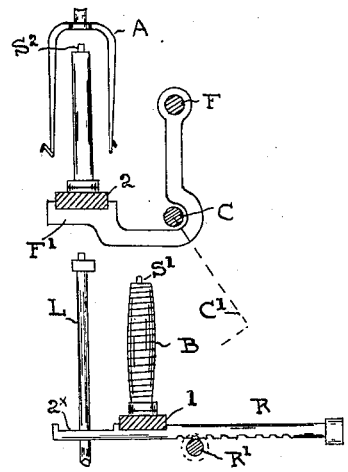
Figure 15:
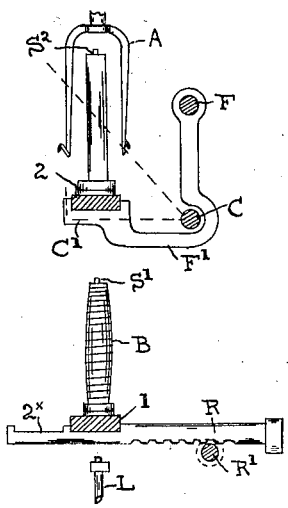

An alternative method is to doff to the rear instead of to the front as hereinbefore described, this involves less movements and, for the purpose of severing the yarn, the addition of a thread guide G as hereinafter described. In this case starting from the position as shown in Fig. 2, the rail 1 is lowered into the seat $1^x$ of the rack R which now carries both rails as shown in Fig. 12, and the lifting pillars L are moved right down. The racks are then operated to bring the rail 2 under the fliers as in Fig. 13 and the empty rail 2 is moved up to spinning position and the fingers F brought into support it as shown in Fig. 14. The rods L are next lowered, the rack moved out, and the cutter member brought in as in Fig. 15, the frame started and the yarn severed. It is now necessary to bring the rail 1 to the front and while spinning is going on, the rail 1 is lifted by the rods L clear of the rear notch and the racks are moved back and the rail allowed to drop in the front notch, the racks being moved out in the position as shown in Fig. 16 after which the cutter is moved back and the lifting rods L are moved up to engage the rail 2 and the holders F are moved back, the position being as in Fig. 2 with the full bobbins to the front.

In order to insure the correct severing of the yarn we have found it desirable to add to each spindle or peg rail 1 and 2 a thread guide G, the nature and formation of which is shown, and will be understood from Figs. 17 and 18, Fig. 17 being an elevation and Fig. 18 an enlarged section through the rail and guide G. As the empty bobbins descend, the guide G will catch the thread should it be near to the rear, and as the swinging cutter comes into play, the thread is somewhat across the bobbin and is thus engaged thereby without the danger of its getting underneath the bobbin.

It will be seen that when doffing is completed (and as hereinbefore described spinning may have commenced before the actual completion of the movements) the rail to the front does not require to be moved into another position as has previously been proposed and there is no obstructing mechanism at or toward the foot of the frame. Transference is simple and doffing can be carried out expeditiously.

The fingers or supports for the upper rail may vary from those hereinbefore described and may be replaced by rack bars carrying suitable supporting means, in which case the upper rail will be required to be moved rather farther up (and then let fall on to or into the supports) than is the case with the fingers arranged as hereinbefore described.

I declare that what I claim is:—

1. A doffing mechanism comprising, in combination with fliers, a pair of spindle supporting rails, longitudinally movable bars for supporting both of said rails contemporaneously in a position remote from the fliers during a portion of the doffing operation, oscillatory fingers for supporting the rails so that the spindles carried by the latter are within the fliers, and pillars for moving either of the rails to and from the bars or fingers.

2. A doffing mechanism comprising, in combination with fliers, a rail for full bobbins and a rail for empty bobbins, a bar having a pair of seats for supporting said rails below and remote from the fliers, fingers for supporting either of the rails so that the bobbins carried thereby are within the fliers, pillars between said bars, and means for actuating the bars, fingers, and rails in their proper sequence to cause the rail having full bobbins to be placed in one of said seats and the rail having the empty bobbins to be placed in the other of said seats.

3. A doffing mechanism comprising, in combination with fliers, a pair of spindle supporting rails, longitudinally movable bars each having a pair of seats for supporting said rails in a position remote from the fliers, oscillatory fingers for supporting the rails so that the spindles carried by the latter are within the fliers, pillars for moving either of the rails to and from the bars and fingers and depositing either rail in either of said seats, and oscillatory means for severing the yarn on the bobbins.

In testimony whereof I have signed my name to this specification in the presence of two subscribing witnesses.

SAM AMBLER.

Witnesses:
 CLEVE WAUGH,
 MARY NORAH WALTON.